Dec. 20, 1960 R. L. STEINER ET AL 2,965,383
CHUCK AND TOOL CONNECTOR
Original Filed Oct. 23, 1957

INVENTORS.
Robert L. Steiner.
BY Clara C. Beiler.
Wood, Herron & Evans.
ATTORNEYS.

2,965,383
CHUCK AND TOOL CONNECTOR

Robert L. Steiner, Cincinnati, Ohio, and Clara C. Beiler, Philadelphia, Pa., assignors to Bromo-Mint Company, Cincinnati, Ohio, a corporation of Delaware Original application Oct. 23, 1957, Ser. No. 691,959, now Patent No. 2,829,285, dated Apr. 1, 1958. Divided and this application Jan. 28, 1958, Ser. No. 715,993

1 Claim. (Cl. 279—102)

This application is a division of copending application, Serial No. 691,959, filed October 23, 1957, now Patent No. 2,829,285. The parent application is directed to a toy electric hand drill which can be used by a child to simulate various operations which can be performed with a real hand drill. The chuck and tool connector of this invention has particular applicability for use with such a hand drill, however, it will be apparent that it can be used with other types of power operated machines.

The objective of the present invention is to provide a novel chuck for supporting a plurality of interchangeable tools or accessories. The present chuck construction has no moving parts and any of the accessories can readily be inserted or withdrawn from the chuck by a child without the use of any tools such as a wrench or key. More particularly, the present chuck comprises a unitary plastic molding which is press fitted over on the end of the motor shaft. The chuck includes a relatively deep socket adapted to receive the elongated shank of each of the accessories. The shank of each of these accessories has a slight longitudinal taper so that the shank can be wedged within the chuck and frictionally held in place.

We have determined that a frictional grip of this type is sufficient to hold the accessories in place against axial movement. However, to insure a positive rotational drive between the chuck and accessory, especially after the parts become worn, each tool shank includes one or more radially extending projections adapted to be received within a corresponding recess in the socket so that there is a positive rotative engagement between the socket and accessory. A tool is mounted in the chuck by merely pressing the tool shank into the chuck socket until the shank is wedged in place. The tool is thus frictionally clamped within the socket against longitudinal withdrawal and is positively engaged by the socket for rotational movement. To replace the tool, the child merely pulls it outwardly.

Figure 1:
Figure 1 is a perspective view of a screw driver attachment.
Figure 2:
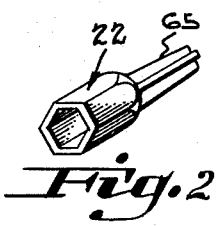
Figure 2 is a perspective view of a socket wrench attachment.
Figure 3:
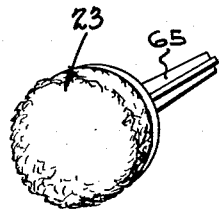
Figure 3 is a perspective view of a buffing wheel attachment.
Figure 4:
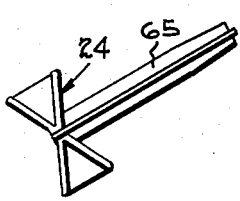
Figure 4 is a perspective view of a mixing paddle.
Figure 5:
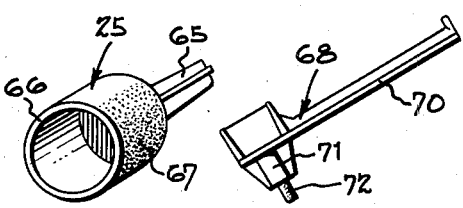
Figure 5 is a perspective view of a "grinding wheel" attachment.
Figure 6:
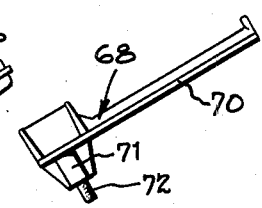
Figure 6 is a perspective view of an "axe" adapted for use with the "grinding wheel."
Figure 7:
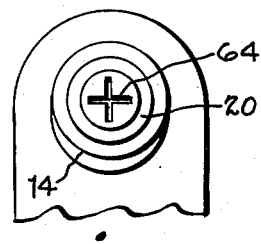
Figure 7 is an enlarged elevational view of the chuck end of the drill.

For the details of construction of a toy hand drill to which the present invention is applicable, reference is made to the above identified copending application, now Patent No. 2,829,285. A portion only of such a drill is shown at 14 in the drawings. The numeral 19 indicates a drive shaft projecting from the drill and the numeral 20 designates a chuck incorporating the principles of the present invention. As shown, the chuck 20 is made of plastic material and it is affixed to the outer end of shaft 19. The chuck, in its use with a toy electric hand drill, may be adapted to receive a plurality of interchangeable tools such as a screw driver attachment 21, a socket wrench 22, a buffing wheel 23, a mixing paddle 24, and a grinding wheel 25.

Figure 8:
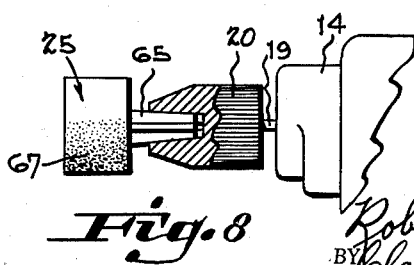
Figure 8 is an enlarged elevational view, partially in section, showing the "grinding wheel" inserted in the chuck.

As shown, the forward end of chuck 20 is tapered and it is provided with a socket 64. Socket or recess 64 is adapted to receive and frictionally support a tool shank. The socket is also configurated to positively rotate the shank. In the preferred embodiment, socket 64 comprises two slits disposed at right angles to one another. These slits extend to a substantial depth within the chuck as best shown in Figure 8. Each of the tools 21–25 adapted to be inserted within the chuck is provided with a shank 65 which tapers slightly in a longitudinal direction toward the end of the shank which is slightly smaller than the end of the socket. Each of the tools further includes one or more radial projections such as the four cross arms adapted to be received within the socket recess to form a positive rotative drive. Consequently, when a tool such as the grinding wheel shown in Figure 8 is pressed into the socket, the shank binds against the walls of the socket so that the tool is frictionally held in place against longitudinal withdrawal, and is positively rotated.

The grinding wheel 25 comprises a unitary plastic molding including shank 65 and a tubular end portion 66. A thin sheet of a suitable abrasive material 67 is secured to the periphery of end portion 66 by means of any suitable adhesive. The grinding wheel is adapted for use with "axe 68." This axe is a molded plastic member including a handle 70 and a socket 71 for receiving a piece of flint 72. To use the grinding attachment, it is inserted in socket 20. The trigger is then depressed causing the wheel to be rotated. When the abrasive sheet covering the wheel is brought into contact with flint 72, large quanties of sparks are emitted similar to those produced by an actual grinder. Grinding wheel 25 can be replaced by pulling it outwardly and any other tool can then be inserted in chuck 20. For example, buffing wheel 23 can be inserted and used to polish or buff toys and the like. This buffing wheel includes a disc secured to shank 65 and a quantity of fibrous material adhesively secured to said disc. Similarly, paddle 24 can be inserted to stir liquid within a container. This paddle comprises a shank 65 and two triangular paddle sections extending perpendicularly from said shank.

As shown, the shank of each tool is cruciform in cross section to provide four identical, radial ribs. Each of these ribs has faces at the opposite sides thereof which are planar and an outer edge which is substantially flat. However, the outer edge of each rib tapers gradually toward the outer end of the shank. Additionally, as shown, the socket which is in the outer end of the chuck is also cruciform in cross section to provide four identical radial grooves. Each of these grooves has side walls which are planar and a substantially flat bottom. The outer end of the shank of each tool is substantially smaller in cross section than the outer end of the socket to facilitate insertion of the shank into the socket. Furthermore, each groove of the socket is dimensional to receive a rib of the tool such that a loose slip-fit exists between the side walls of the groove and the side faces of the rib and such that a wedge-fit exists between the outer edges of the ribs and the bottoms of the grooves when the shank is within the socket. In this way the drive torque of the chuck is transmitted to the shank initially through the interfacial contacts between the side walls of the grooves and planar faces of the ribs. On the other hand, the tool is held within the socket primarily as a result of the friction of the wedge-fit existing between the outer edges of the ribs and the bottoms of the grooves. Hence, the wedge-fit is over the small areas whereas the driving connection is over substantially large areas. The wedge-fit over the small areas makes it easier for the shank to be withdrawn from the chuck and adapts the connector here for use by small children.

When simulating a drilling operation, work bench 73 is placed upon a suitable supporting surface with screw members 76 being in an elevated position. Screw driving attachment 21 is then inserted in socket 20 and the screw driving attachment placed over the head 77 of one of the screws 76. Web or blade 82 of the screw driver attachment engages the slot in the screw driver head. When trigger 18 is depressed, the screw is rotated and is rapidly driven downwardly through shelf 74. This gives the illusion that the shelf is being drilled. Legs 75 are sufficiently long to provide ample vertical clearance for appreciable screw travel. However, the legs are preferably slightly shorter than the length of the screws so that the advance of a screw is stopped by the abutment of nut 78 with a table or other supporting surface before head 77 is brought into binding engagement with the shelf.

After each of the screws has been driven through the shelf in this manner, the work bench is inverted to expose caps 78 which are now in an elevated position. Screw attachment 21 is withdrawn from the socket and is replaced by wrench socket 22. This member is then brought into engagement with one of the nuts 78 and the trigger is depressed to drive the screw back down through the shelf in the same manner as before.

Having described our invention, we claim:

Means to removably connect a tool in driving relation with a chuck adapted to be rotatably driven, said means comprising an elongated shank formed as an integral part of said tool which is cruciform in cross section to provide four identical, radial ribs, each of said ribs having faces at the opposite sides thereof which are planar and an outer edge which is substantially flat, there being a socket in the end of the chuck to receive said shank, said socket being cruciform in cross section to provide four identical, radial grooves, each of said grooves having side walls which are planar and a substantially flat bottom, each of said outer edges of the shank tapering gradually toward the outer end of the shank opposite the tool such that said outer end is substantially smaller in cross section than the outer end of the socket to facilitate insertion of the shank into the socket, and each groove of the socket being dimensioned to receive a rib of the tool such that a loose slip-fit exists between the side walls of the grooves and the side faces of the ribs and such that a wedge-fit exists between the outer edges of the ribs and the bottoms of the grooves when the shank is within said socket, whereby the driving torque of the chuck is transmitted to the shank initially through the interfacial contacts between planar side walls of the grooves and planar faces of the ribs, and whereby the tool is held within the socket primarily as a result of the friction of the wedge-fit between the outer edges of the ribs and the bottoms of the grooves.

References Cited in the file of this patent

UNITED STATES PATENTS

| | | |
|---|---|---|
| 1,136,987 | Wakfer | Apr. 27, 1915 |
| 1,210,666 | Mathews | Jan. 2, 1917 |
| 1,528,628 | Powell | Mar. 3, 1925 |
| 1,564,342 | Gebhardt et al. | Dec. 8, 1925 |
| 1,685,412 | Arnold | Sept. 25, 1928 |
| 1,691,200 | Krug | Nov. 13, 1928 |
| 1,854,626 | Rigall | Apr. 19, 1932 |
| 1,892,997 | Oldenburg | Jan. 3, 1933 |
| 2,421,901 | Murad et al. | June 10, 1947 |
| 2,833,576 | Cirone | May 6, 1958 |

FOREIGN PATENTS

| | | |
|---|---|---|
| 109,670 | Great Britain | Sept. 27, 1917 |
| 279,186 | Germany | Oct. 13, 1914 |

OTHER REFERENCES

Licentia et al.: (German application Serial No. L-14,507, printed April 19, 1956) (Kl 21d' 47).